Inventors
Set Ingvar Abrahamsson
Per Helge Perssons
By James R Campbell

3,702,138
APPARATUS FOR REMOVING RUBBER RINGS FROM A MOLD

Set Ingvar Abrahamsson, Ringvagen 16, and Per Helge Perssons, Fanestadsvagen 6, both of Forsheda, Sweden
Filed Mar. 31, 1971, Ser. No. 141,924
Claims priority, application Sweden, Mar. 31, 1970, 4,327/70
Int. Cl. B29h 7/00
U.S. Cl. 214—1 R      6 Claims

ABSTRACT OF THE DISCLOSURE

An arrangement for removing rubber rings from semi-circular grooves machined in the outside surface of a mold core. After the rings are molded in the grooves and the mold opened, a ring removal mechanism is advanced towards the core for dislodging and removing each ring from the position in which it was molded in a core groove. The mechanism includes a base supporting a motor which drives a pair of endless rubber belts respectively mounted on arms located on opposite sides of the core. As the mechanism is moved inwardly into a ring engaging position, the motor driven belts contact each ring sequentially and because of the friction established between the linearly moving belt and each ring the ring is caused to be rolled out of its groove and onto a stationary bar for subsequent removal from the mold apparatus.

BACKGROUND OF THE INVENTION

The invention described herein relates to an arrangement for removing molded rubber rings from grooves formed on the core surfaces of a mold.

The design of mold to which the present invention relates generally comprises a cylindrical core having a multiplicity of annular and axially spaced grooves around its outer surface. A pair of semi-cylindrical members designed to encompass the core have similar grooves on their inner surfaces. When the outer members are moved into contact with the core, the grooves become aligned and form cavities of circular cross-section in which rubber is deposited for forming the rings. When the core is opened upon completion of the molding process, the outer half of each rubber ring thus formed is exposed while the remaining half is imbedded in the grooves in the core.

Although molds of this design are generally old, the major problem encountered in the manufacturing process relates to the expediency with which each ring may be removed from the core in an undamaged condition. In the usual case, the rings are simply stripped from the core surface by hand but since the rings stick to the core's surface, special tools are required to effect their removal, and as a result, the operation is inefficient and labor costs are therefore excessively high. Stripping by hand also adversely affects the ring quality since uniformity in cross-section cannot always be achieved and in many instances the rings are so severely damaged during removal as to make then unusable.

Alternative approaches have been made to solving the ring removal problem, such as designing the core in the special way disclosed in Swedish Pat. No. 318,100. However, the Swedish design will not accommodate all rings of varying sizes and cross-sections so that the disclosed principle does not effectively resolve the ring removal problem.

SUMMARY OF THE INVENTION

Briefly stated, we eliminate the above disadvantages of the prior art by providing a ring removal mechanism which is caused to be accurately aligned with both the core and the rings to be removed. The mechanism is designed to move axially toward the core and into engagement with individual rings for sequentially contacting the exposed surface of adjacent rubber rings. Doing so forces each ring out of its position in the core grooves and moves it to a storage area on the mechanism for subsequent removal therefrom.

An object of our invention therefore is the provision of a mechanism for automatically effecting the removal of rings individually from a mold core.

Another object of our invention is to provide a power driven mechanism having arms for engaging and removing individual rings from core grooves and storing such rings on the mechanism prior to their removal.

Another object of our invention is to provide a movable mechanism designed for accurate alignment with a ring containing core and having movable elements for dislodging and removing rings formed on the core to a different area.

BRIEF DESCRIPTION OF THE DRAWINGS

While the specifications conclude with claims particularly pointing out and distinctly claiming the subject matter of the invention, it is believed the invention will be better understood from the following description taken in connection with the accompanying drawings wherein:

DESCRIPTION OF THE PREFERRED EMBODIMENT

Figure 1:
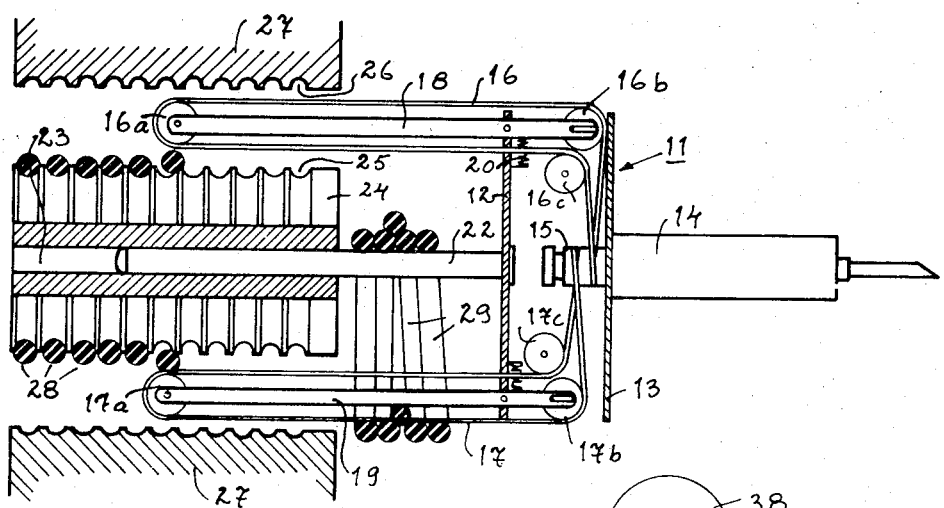
FIG. 1 is a cross-sectional view in elevation, partly in section, of the ring removal mechanism of this invention.

Referring now to the drawings wherein like reference characters designate like or corresponding parts throughout several views there is shown in FIG. 1, a conventional mold for forming rings of rubber or other material and comprises a cylindrical core 24 having in its outside surface annular grooves 25 spaced axially along the core length. A pair of semi-cylindrical members 27 are located circumferentially around the core and are arranged to be moved into contact with the exposed core surfaces so that the complimentary grooves 26 of the same size and configuration as grooves 25 on the more, mutually coact to provide a closed cavity of circular cross-section. Rubber or other material is then caused to fill the cavities thus formed by the grooves 25–26 and upon the application of heat or by practicing another process, the rubber is caused to be vulcanized and thus form the ring as an end product. As is apparent from the drawing, the rings are separately formed and are axially spaced from each other along the core length thereby to permit removal of each ring independently of the other rings in the core grooves.

After the vulcanization process is complete and the outer members of the molds are separated from the core as in FIG. 1, the rings adhere slightly to the metal surface of the groove machined in the core. It is evident that to remove the rings, they must be stretched beyond their original diameter to permit sliding them over the ridge of the next adjacent grooves.

To accomplish ring removal, the invention contemplates the use of a driving mechanism 11 which is axially adjustable relative to the core. It will be understood that the mechanism normally appears on the right side of the mold and that FIG. 1 illustrates the mechanism in an operative position and wherein some of the rings already have been removed from the core surface. The mechanism includes front and rear plates 12 and 13 connected together in a manner to form a stable stand or base which supports the movable components used in effecting ring removal. A motor 14 is mounted in the center of plate 13 and includes a pulley 15 appropriately designed to drive a number of belts, two of which 16 and 17, are illustrated in the drawing. As shown, the belt 16 extends over break rollers 16a, 16b and 16c and is driven by the motor driven pulley 15 attached to the motor drive shaft. Belt 17 engages break rollers 17a, 17b and 17c and is likewise driven from pulley 15. Because the two belts 16 and 17 move linearly in two planes perpendicular to each other, they will be twisted in the portions between pulley 15 and the break rollers 16b, 16c and 17b, 17c respectively.

The break rollers and the belts are carried by flexible arms 18 and 19 arranged to be positioned on opposite sides of the core. Although two such arms and corresponding belts have been shown, it will be apparent to those skilled in the art that more than two such arms and belts may be used for removing rings from the mold core. Since the arms must be movable perpendicular to the core axis to accommodate cores and rings of different diameters, and since the arms must move in unison with each ring during the removal process as the ring climbs over the top of adjacent grooves, the flexible arms are pivoted on front plate 12 as shown and are biased to a ring engaging position by springs 20 and 21.

As indicated previously, the mechanism is normally in an inoperative position outside of the mold body. As the outer members 27 are opened, to assure that the arms 18 and 19 will be accurately aligned with the core 24, the front plate 12 carries an aligning member 22 in the shape of a rod in circular cross-section which is designed to have a sliding fit with an axially extended opening 23 formed in the center of the core 24. The aligning member 22 is made longer than the arms 18 and 19 to help assure that the mechanism will stay in alignment during the process of removing rings from the grooves in the core.

In operation, after the vulcanization process is complete and the mold opened by moving outer members 27 outwardly from the core, the rings become exposed and a space is provided for the reception of arms 18 and 19. The alignment member 22 of the stripping mechanism is inserted in the opening 23 and the mechanism moved inwardly toward the core until the belts 16 and 17 contact the first ring positioned in the core grooves. Since the belts 16 and 17 are moving in a direction such that upon contact with the ring on groove 25, the frictional force between the belt and the ring causes the ring to ride over the flange on the end of the core and then drop by gravity upon the alignment member 22. During the time the ring is rolling from the groove onto the ridge, the ring diameter increases and the arms 18 and 19 simultaneously are moved outwardly against the action of springs 20 and 21 but the belts still remain in contact with the rings and continued belt movement causes the ring to fall onto the alignment member 22.

After the first ring is removed, the mechanism is advanced to the next outermost ring and after it is rolled off the core, the mechanism is advanced to the next adjacent ring and this process then continued until all rings have been removed from the core. It will be apparent that because of the position of the arms 18 and 19 relative to the core, rings of only a limited diameter may be formed since they otherwise will contact the belt 17. To accommodate rings of larger diameters, the arms 18 and 19 may be rotated to a position 90° from that shown and the rings then will rest on aligning member 22 and have their lowest point a substantial distance below the core body. In the event even greater variation is required because of ring diameter, the design illustrated in FIG. 2 may conveniently be used for this purpose.

Figure 2:
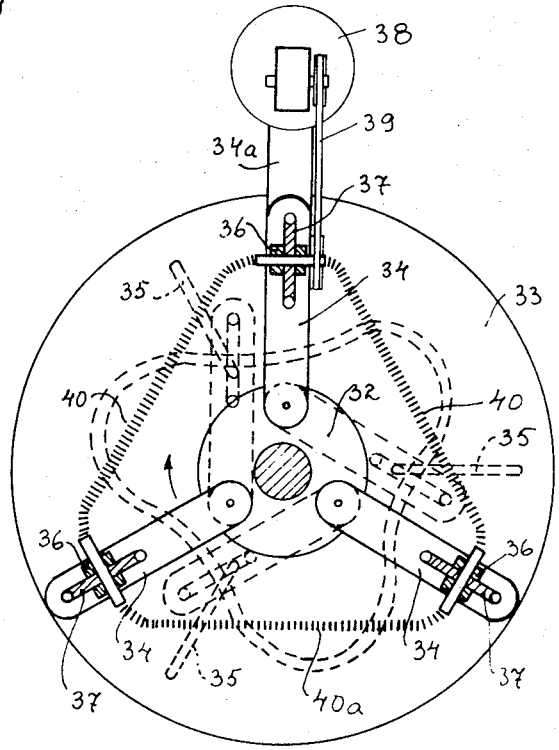
FIG. 2 is an end view of a modification of the invention.

FIG. 2 represents a front view, i.e., seen in the direction towards the driving unit. By and large, this embodiment is of a design approximately similar to the device described above. The front plate of the stand in this case carries a circular central portion 32 and a surrounding ring 33 which is adapted to rotate around the central portion 32. Three arms 34 are hingedly attached to this central portion. Three grooves 35 are formed in the ring 33. Trunnions (not shown), fixedly attached to the underside of the arms 34, rotate in the said grooves 35. When the ring is twisted in relation to the central portion, all three arms 34 will turn simultaneously at the same rate of angle, as for example into the position as shown by dotted lines in FIG. 2. The arms carry protruding members 36 in which two belt pulleys 37 are journalled, thus one pulley at the outermost end of the protruder and one close to the ring 33. One of the arms 34 carries an extension piece 34a to which is attached a worm gear motor 38, the driving shaft of which drives the pulley 37 over a transmission 39.

The movement is transmitted by flexible shafts 40 to the other two pulleys which, as illustrated, can also be mutually connected together by a flexible shaft 40a. In this type of design it will not be necessary to have the protruders spring operated. The stripping unit will be retained in such a working position that the weight of the motor will produce a certain movement and exert an inward pressure on the arms as well as protruders and belts.

In view of the above, it will be apparent that many modifications and variations are possible in light of the above teachings. It therefore is to be understood that within the scope of the appended claims the invention may be practised other than as specifically described.

What we claim as new and desire to secure by United States Letters Patent is:

1. A mechanism for removing rings formed in the core of a mold of the type having separate and axially spaced grooves in its outer surface and including rings in said grooves comprising, a movable base supporting an aligning member engageable with said core for aligning said mechanism therewith;

a drive motor on said base;

arms adjusatbly supported on said base and extending parallel with an on opposite sides of said core;

ring engaging means on said arms connected with said drive motor, said means being engageable sequentially with each of said rings for causing the ring to move out of its groove to a place of deposit prior to removal from said mechanism.

2. The combination according to claim 1 wherein said aligning member extends axially in a more formed in said core and is arranged to extend the length of said core.

3. The combination according to claim 2 wherein a pulley is connected to the shaft of said drive motor, rollers on said arms;

said ring engaging means comprising a pair of belts driven by said pulley and respectively extending over said rollers on each of said arms;

said arms being positioned relative to said core so that when said belts engage the first of said rings on said core, they frictionally move the ring out of its groove and into said place of deposit prior to engaging the next ring on said core.

4. The combination according to claim 3 wherein said belts move in a direction away from said core to cause said rings to be rolled off the core one by one until all rings are removed therefrom.

5. The combination according to claim 4 wherein said arms are spring biased in a direction toward said rings.

6. The combination according to claim 2 wherein said arms are slidably mounted on said base; and
   adjustable means on said base for accommodating rings of different radii formed on various diameters of cores.

References Cited

UNITED STATES PATENTS

| | | | |
|---|---|---|---|
| 1,801,613 | 4/1931 | Ratzer | 425—438 X |
| 2,330,762 | 9/1943 | Tooker | 425—438 X |

GERALD M. FORLENZA, Primary Examiner

G. F. ABRAHAM, Assistant Examiner

U.S. Cl. X.R.

29—200 R; 198—165; 214—8.5 G, DIG. 1; 425—436, 444

UNITED STATES PATENT OFFICE
CERTIFICATE OF CORRECTION

Patent No. 3,702,138          Dated November 7, 1972

Inventor(s) Set Ingvar Abrahamsson and Per Helge Perssons

It is certified that error appears in the above-identified patent and that said Letters Patent are hereby corrected as shown below:

Col. 2, line 54, "more" should be --- core ---.

Col. 4, line 57 (Claim 1) "an" should be --- and ---.

Col. 4, line 64 (Claim 2) "more" should be --- bore ---.

Signed and sealed this 10th day of April 1973.

(SEAL)
Attest:

EDWARD M. FLETCHER, JR.          ROBERT GOTTSCHALK
Attesting Officer                Commissioner of Patents